United States Patent [19]
Gomez et al.

[11] Patent Number: 5,627,313
[45] Date of Patent: May 6, 1997

[54] POSITIVE DISPLACEMENT VOLUMETRIC MEASURING DEVICE

[76] Inventors: Tremiño J. A. Gomez, C/ Juan Bravo, no 58, Madrid; Redondo S. R. Valbuena, C/ Acera de Recoletos, no 3, Valladolid, both of Spain

[21] Appl. No.: 491,867
[22] PCT Filed: Nov. 15, 1994
[86] PCT No.: PCT/ES94/00118
§ 371 Date: Sep. 1, 1995
§ 102(e) Date: Sep. 1, 1995
[87] PCT Pub. No.: WO95/14216
PCT Pub. Date: May 26, 1995

[30] Foreign Application Priority Data
Nov. 15, 1993 [ES] Spain ............... P9302381

[51] Int. Cl.$^6$ .................................................. G01F 3/04
[52] U.S. Cl. ........................................ 73/261; 73/861.77
[58] Field of Search ............................ 73/253, 861.75, 73/861.77, 861.79, 261

[56] References Cited

U.S. PATENT DOCUMENTS

| | | | |
|---|---|---|---|
| 1,797,233 | 3/1931 | Huebotter | 73/261 |
| 2,684,598 | 7/1954 | Backman | 74/230.17 |
| 3,044,316 | 7/1962 | Forster | 74/472 |
| 3,152,490 | 10/1964 | Lemieux | 74/688 |
| 3,188,863 | 6/1965 | Buchler | 73/261 |
| 3,342,071 | 9/1967 | Meyers | 73/261 |
| 3,358,508 | 12/1967 | Silvern | 73/261 |
| 3,707,089 | 12/1972 | Stradella et al. | 73/740 |
| 3,748,903 | 7/1973 | Irie et al. | 73/261 |
| 3,873,814 | 3/1975 | Mirdadian | 73/861.77 |
| 3,965,929 | 6/1976 | Jenkins, III et al. | 73/862 |
| 4,295,369 | 10/1981 | Wendelboe | 73/261 |
| 4,579,008 | 4/1986 | Bohm et al. | 73/261 |
| 4,641,522 | 2/1987 | Lopresti | 73/261 |
| 4,848,164 | 7/1989 | Quarve et al. | 73/861.77 |
| 4,872,352 | 10/1989 | Alden et al. | 73/861.77 |
| 5,248,246 | 9/1993 | Lew et al. | 418/4 |

FOREIGN PATENT DOCUMENTS

| | | | |
|---|---|---|---|
| 882498 | 10/1953 | Germany . | |
| 2950213 | 6/1980 | Germany | 73/861.77 |
| 2952089 | 7/1981 | Germany | 73/861.77 |
| 3609131 | 9/1987 | Germany | 73/861.79 |
| 58-184514 | 10/1983 | Japan | 73/253 |
| 4-244918 | 9/1992 | Japan | 73/861.77 |
| 4-265825 | 9/1992 | Japan | 73/861.75 |
| 2123557 | 2/1984 | United Kingdom | 73/861.77 |

*Primary Examiner*—Richard Chilcot
*Assistant Examiner*—Paul D. Amrozowicz
*Attorney, Agent, or Firm*—Michaelson & Wallace; John C. Pokotylo; Peter L. Michaelson

[57] ABSTRACT

The system has been innovated by means of ellipses that mesh tangentially with each other, given the importance of mixing accurate amounts of liquids, or merely controlling quantities entering or leaving a reservoir. The shape of the ellipses is noteworthy in that they comprise two round parts and two flat parts, a round part of one of the ellipses meshing with a flat part of the other ellipse. The ellipses move due to a free-falling liquid passing through them, their movement or speed defining the volume of the liquid, the quantity of which is accurately measured. In order to achieve a constant accuracy, the ellipses move the drive pulley, which transmits impulses to a driven pulley through a trapezoidal belt, the driven pulley having a variable diameter to tighten the belt and maintain an accurate reading at all times. This is the innovation proposed by the POSITIVE DISPLACEMENT VOLUMETER.

4 Claims, 5 Drawing Sheets

POSITIVE DISPLACEMENT VOLUMETRIC MEASURING DEVICE

BACKGROUND OF THE INVENTION

The experience we have acquired with our previous methods have prompted us to introduce the new "POSITIVE DISPLACEMENT VOLUMETER" system.

The new system, yielding an accuracy that the market was as yet lacking, covers a need that the market was demanding, that is, sometimes allowing accurate mixtures to be obtained and sometimes simply allowing the quantity of a liquid "x" with which it is supplied to be known.

These have been our reasons for researching into and developing the "POSITIVE DISPLACEMENT VOLUMETER" system, its mechanism being described in FIG. 5 and outlined in the previous figures.

SUMMARY OF THE INVENTION

The system works with liquids passing through a mechanism that establishes the precise quantity of liters passing through such mechanism.

DETAILED DESCRIPTION

Figure 1:
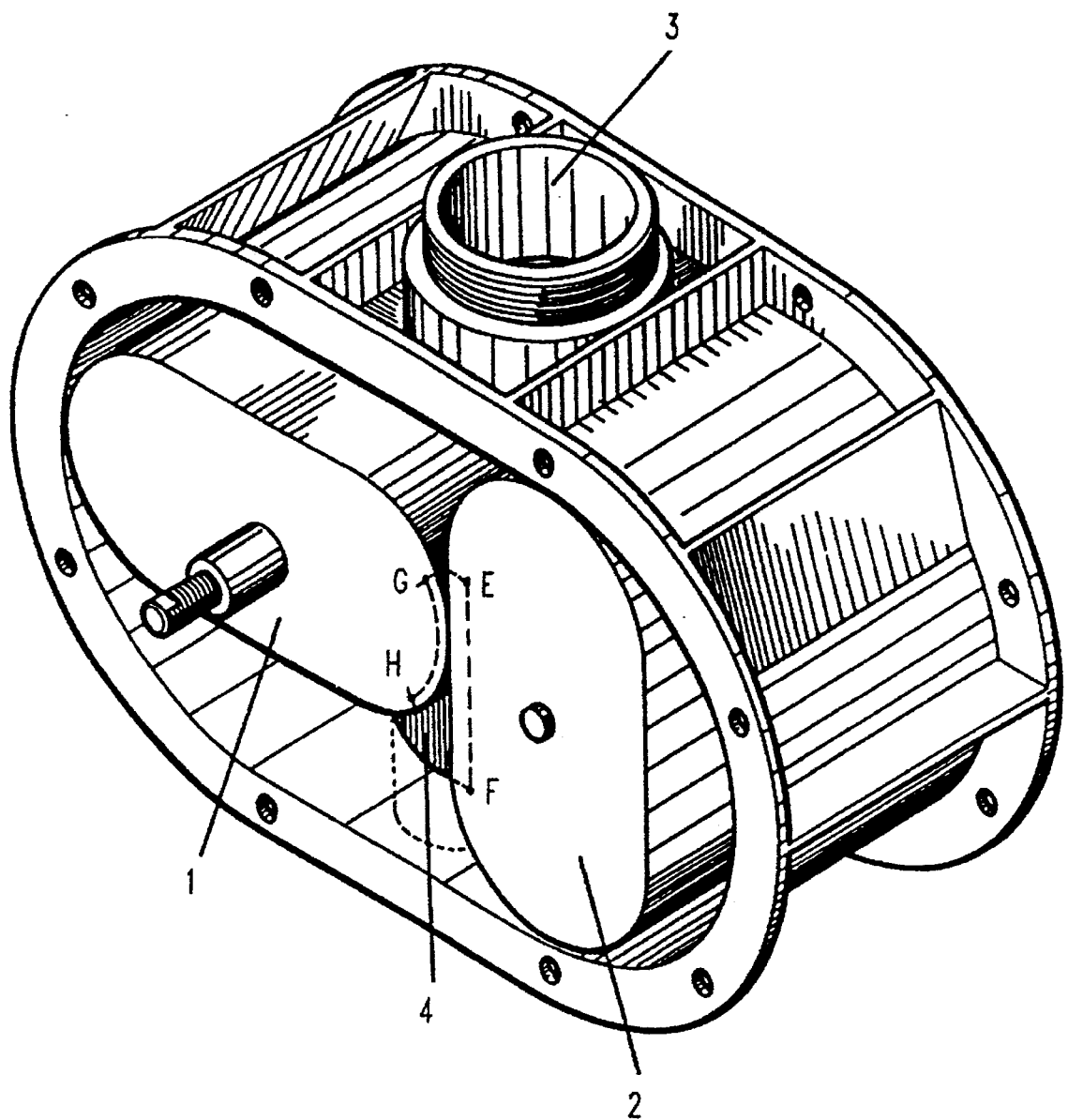
FIG. 1 is a perspective view of the positive displacement volumeter of the present invention.

Two racetrack-shaped surfaces 1 and 2 meshing with each other, as shown in FIG. 1, are among the various elements making up the mechanism. These racetrack-shaped elements 1 and 2 are shifted upon the free-flowing passage of the liquid entering through a mouth 3 and leaving through outlet port 4, creating a constant volume that is full-reliably measured by the innovative system set out hereinafter.

The flat and longer side of the racetrack-shaped element 2 in our system, FIG. 1, contacts between "E" and "F" with the sharpest curve of the opposite racetrack-shaped element 1 between "G" and "H", such that the line E-F of racetrack-shaped element 2 defines an exact tangent of the curve G-H of racetrack-shaped element 1 upon rotation, thereby permitting the volume of passing liquids to be continuously and positively measured.

Figure 2A:
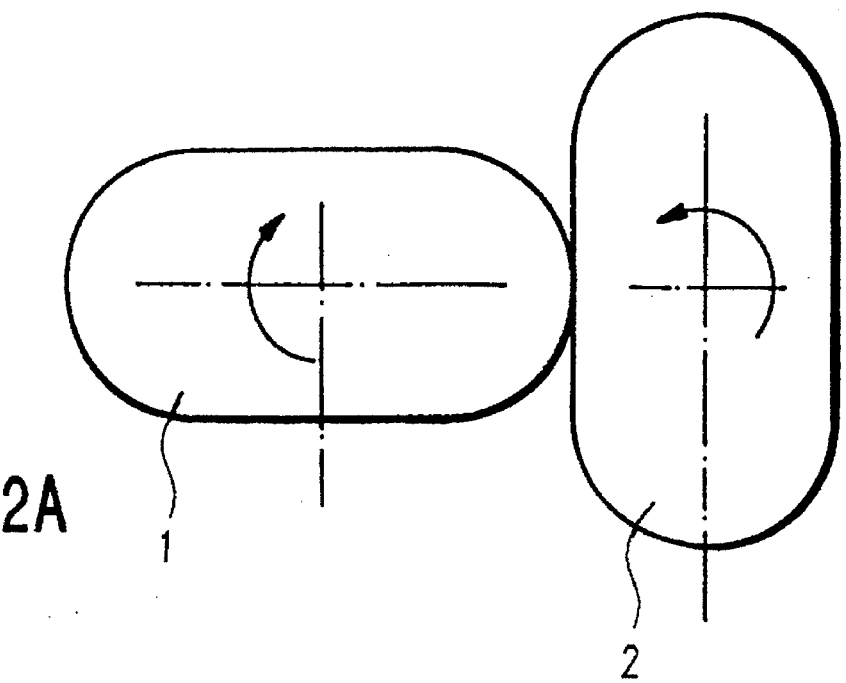
FIGS. 2A and 2B are end views which illustrate various states of racetrack-shaped elements of the positive displacement volumeter of the present invention.
Figure 2B:
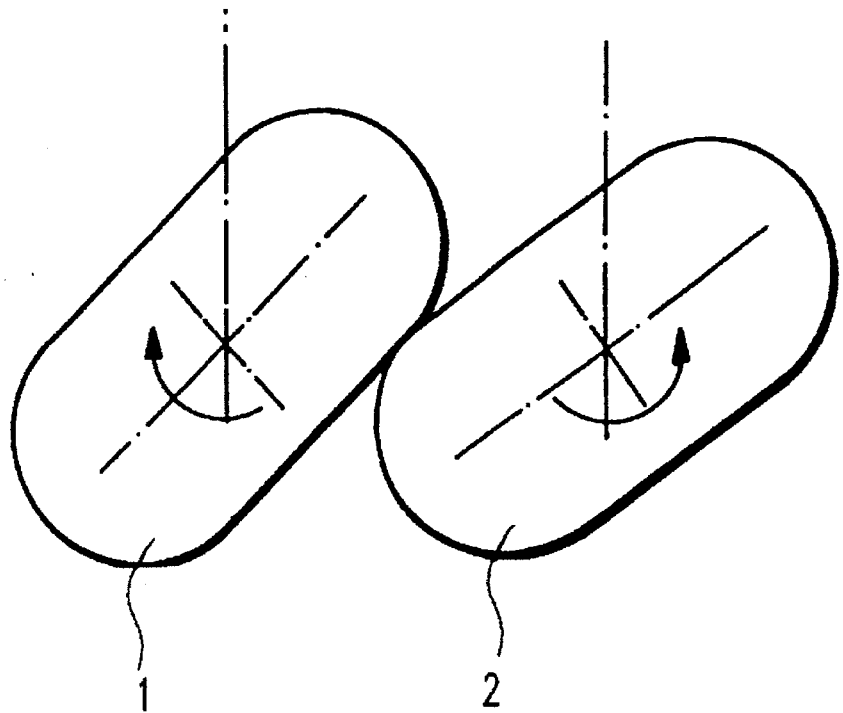

FIG. 2A shows the long and short axes of the racetrack-shaped surfaces of elements 1 and 2 lying at a right angle. FIG. 2B shows the racetrack-shaped surfaces of elements 1 and 2 in one of the many positions that come about when they turn in the direction of the arrows.

Figure 3A:
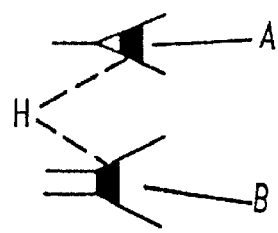
FIG. 3A illustrates the operation of a pulley used in the present invention and FIGS. 3B–3D are end views of pulleys used in the present invention.
Figure 3B:
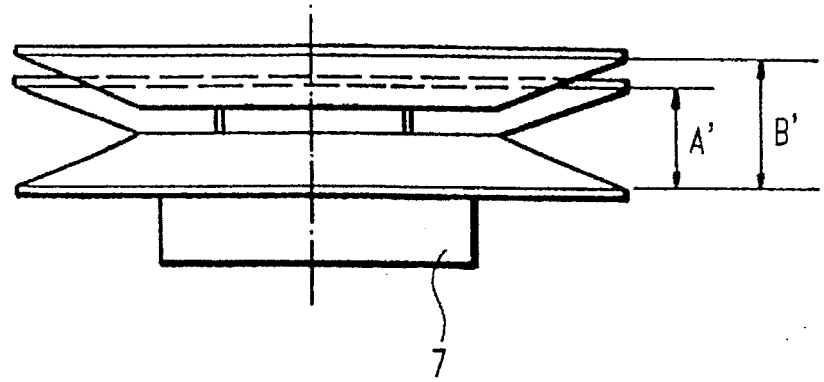
Figure 3C:
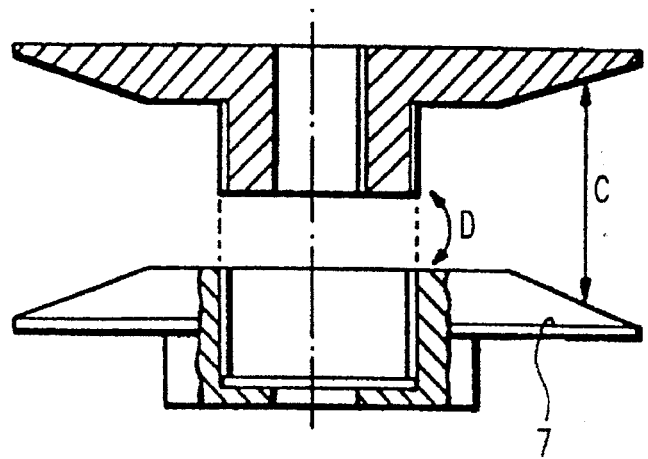
Figure 3D:
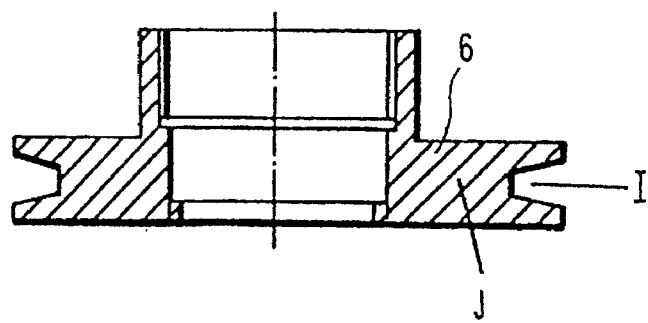

To ratify the innovative accuracy of the system and its constant reliability, FIGS. 3B and 3C show a trapezoidal pulley 7 having a variable diameter to obtain accurate volume measurements through belt tension.

FIG. 3A shows a belt 8 within the closed faces "A" of the pulley 7, and within the open faces "B" of the pulley 7. The same is shown in the pulley 7 with "A'" and "B'" in FIG. 3B.

FIG. 3C shows the two faces of the pulley 7 fitted at "D" to separate the faces at "C", thereby to achieve a belt tension to absorb possible expansions thereof.

Figure 4A:
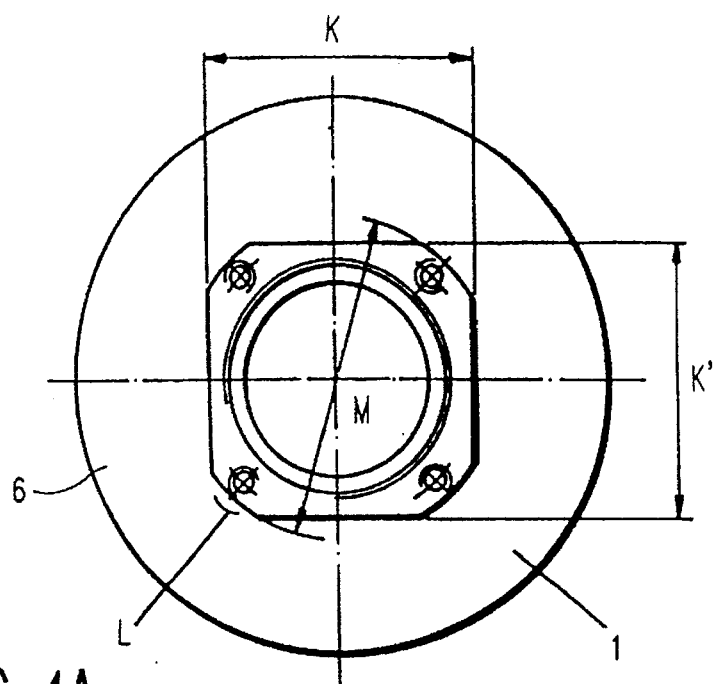
FIG. 4A is a plan view of the pulley of FIG. 3D
Figure 4B:
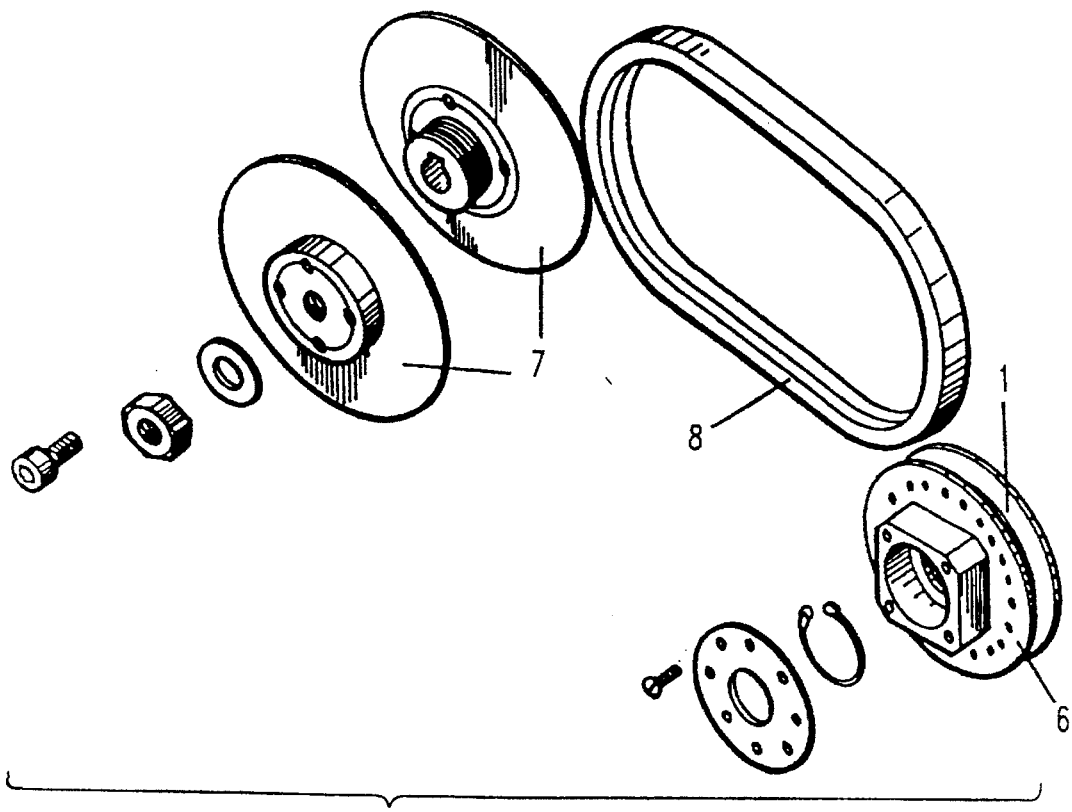
FIG. 4B is a perspective view showing the pulleys and a belt used in the present invention.

FIGS. 4A and 4B show the meter drive system propelled by the racetrack-shaped element 1 upon the free-flowing passage of liquids.

FIG. 4A shows a constant diameter pulley 6 that transmits the volumetric passage of liquid to the twofold meters. This pulley 6 carries a die, faces "K" and "K'" with a rounded point "L" that provides the mechanical-magnet meter with impulses through magnets 13 (See FIG. 5), pushing and activating a microswitch 17, making and breaking a circuit inside a self-powered digital counter 12 at a rate of four impulses per pulley turn. The pulley 7 tightens the belt 8 to curb clearances.

Figure 5:
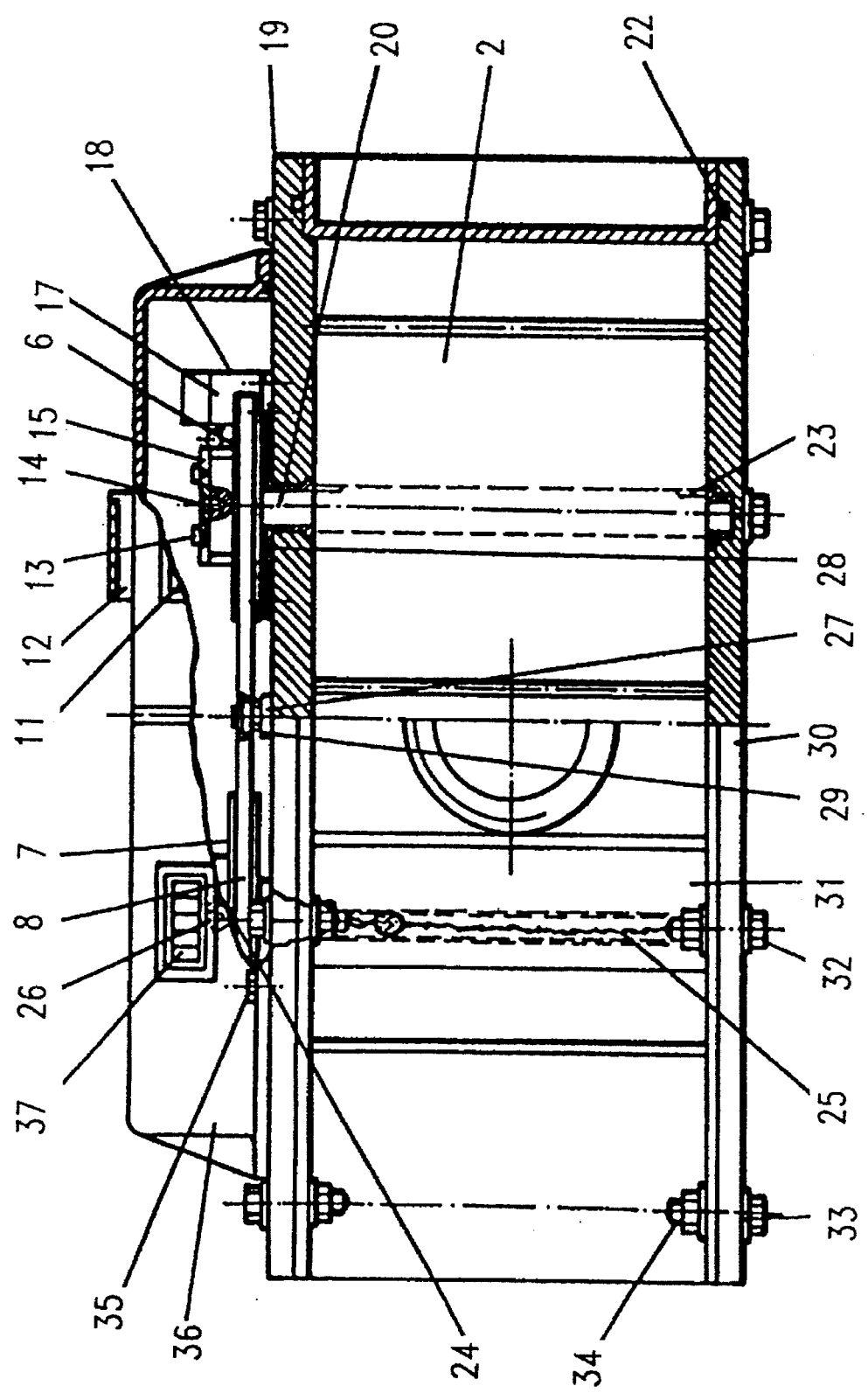
FIG. 5 is a partial cross-sectional plan view of the positive displacement volumeter of FIG. 1.

FIG. 5 describes the meter mechanism as a whole, as follows: 2) Elipse. 6) Calibration (e.g. drive) Pulley. 7) Tightening (e.g. drive) pulley. 8) Trapezoidal Belt. 11) Partial analog-digital counter. 12) "Hummingbird" counter. 13) Magnet. 14) Bearing. 15) Magnet support. 16) Calibration pulley. 17) Microswitch. 18) Microswitch support. 19) Screw. 20) Rotor shaft. 21) Ellipse. 22) O-ring seal. 23) Setting tab. 24) Setting tab. 25) Drive rotor shaft. 26) Nut. 27) Strip and tightening shaft. 28) Eccentric support. 29) Guard rings. 30) Meter cap. 31) Meter body. 32) Cap retaining screw. 33) Washer. 34) Nut. 35) Counter cap screw. 36) Counter cap. 37) Total analong-digital counter.

The volumeter described above yields a verified accuracy through the various counters 11, 12 and 37, the impulses being correct due to the shapes of the racetrack-shaped elements 1 and 2 and the curbing of clearances by means of the variable diameter pulley.

Accordingly, a patent is applied for in accordance with the following:

What is claimed is:

1. A positive displacement volumeter, which is of the type of those formed from two rotary bodies which tangentially mesh there between and being impelled by liquid passing there between, each of the two rotary bodies turning around its respective axis, a first of the rotary bodies being connected to a drive pulley, via a drive shaft, the volumeter also having a driven pulley, and having been provided a tightening trapezoidal belt between said pulleys, wherein both of the rotary bodies adopt approximately the form of a racetrack, both being arranged such that each minor rounded side in a rotary body respectively meshes with a large flat side of the other rotary body in the form of a racetrack.

2. The positive displacement volumeter of claim 1 wherein one of the pulleys is a variable diameter pulley.

3. The positive displacement volumeter of claim 1 wherein the driven pulley is a variable diameter pulley.

4. The positive displacement volumeter of claim 2 wherein the variable diameter driven pulley has an external die which is limited by right faces and has rounded corners, wherein the rotation of the variable diameter driven pulley pushes and activates a microswitch to open or close a circuit inside a self-powered counter at a rate of four impulses by each rotation of the pulley.

* * * * *